US011153012B1

(12) United States Patent
Jiang et al.

(10) Patent No.: US 11,153,012 B1
(45) Date of Patent: Oct. 19, 2021

(54) SYSTEMS AND METHODS IN AN OPTICAL NETWORK

(71) Applicants: Zhiping Jiang, Kanata (CA); Xuefeng Tang, Kanata (CA); Junho Chang, Kanata (CA)

(72) Inventors: Zhiping Jiang, Kanata (CA); Xuefeng Tang, Kanata (CA); Junho Chang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/000,068

(22) Filed: Aug. 21, 2020

(51) Int. Cl.
  *H04B 10/04* (2006.01)
  *H04B 10/516* (2013.01)
  *H04B 10/50* (2013.01)

(52) U.S. Cl.
  CPC ......... *H04B 10/516* (2013.01); *H04B 10/501* (2013.01)

(58) Field of Classification Search
  CPC .. H04B 10/516; H04B 10/548; H04B 10/532; H04B 10/541; H04B 10/40; H04B 10/6161; H04B 10/2569; H04B 10/6163; H04B 10/697; H04B 10/2507; H04B 10/5055; H04J 14/06; H04J 14/02
  USPC ......... 398/183, 184, 188, 65, 152, 158, 159, 398/147, 81, 79, 202, 208, 209, 135, 136, 398/201, 192, 193, 195, 205, 194
  See application file for complete search history.

(56) References Cited

U.S. PATENT DOCUMENTS

| | | | |
|---|---|---|---|
| 8,942,569 B2* | 1/2015 | Tanimura | H04B 10/5055 398/152 |
| 9,112,609 B2* | 8/2015 | Kim | H04B 10/548 |
| 10,698,228 B2* | 6/2020 | Oyama | H04B 10/6162 |
| 2006/0023987 A1 | 2/2006 | Yao | |
| 2014/0023362 A1* | 1/2014 | Vassilieva | H04B 10/2572 398/26 |
| 2014/0363164 A1 | 12/2014 | Kim et al. | |
| 2019/0033630 A1 | 1/2019 | Kim et al. | |

FOREIGN PATENT DOCUMENTS

| | | |
|---|---|---|
| CN | 102439879 A | 5/2012 |
| CN | 109314579 A | 2/2019 |
| WO | 2020248820 A1 | 12/2020 |

OTHER PUBLICATIONS

Louchet et al., "Comparison of XPM and XpolM-Induced Impairments in Mixed 10G-100G Transmission", 2011 13th International Conference on Transparent Optical Networks.

* cited by examiner

*Primary Examiner* — Hanh Phan (57) ABSTRACT

Optical transmitters, receivers, and methods are described in an optical network. An optical transmitter comprises an encoder configured to receive an input data stream and to encode the input data stream into a signal. The signal is defined as a sequence of regular units, and a rotator is configured to receive each unit of the signal and to output, for each given input unit with an input state of polarization (SOP), a respective given output unit associated with an output SOP. The output SOP of the given output unit is different from a corresponding output SOP of each other output unit that is immediately adjacent to the given output unit. The output SOPs of the units in a transmitted signal may form an alternating pattern (or other repeating pattern), which may help to lower the average BER, in particular, due to forward error correction (FEC).

11 Claims, 10 Drawing Sheets

FIG. 4A $$\begin{pmatrix} S_X^{Out} \\ S_Y^{Out} \end{pmatrix} = U \begin{pmatrix} S_X^{In} \\ S_Y^{In} \end{pmatrix} = \begin{pmatrix} W_{XX} & W_{XY} \\ W_{YX} & W_{YY} \end{pmatrix} \begin{pmatrix} S_X^{In} \\ S_Y^{In} \end{pmatrix}$$

FIG. 4B $$U_1 = \begin{pmatrix} 1 & 0 \\ 0 & 1 \end{pmatrix}$$

FIG. 4C $$U_2 = \begin{pmatrix} 1 & -1 \\ 1 & 1 \end{pmatrix}$$

SYSTEMS AND METHODS IN AN OPTICAL NETWORK

RELATED APPLICATIONS

This is the first patent application for the present disclosure.

TECHNICAL FIELD

The present application relates to optical communication networks, and in particular to systems and methods for mitigating polarization-related optical impairments in coherent optical systems.

BACKGROUND

In optical telecommunication systems, optical networks are used to convey information (e.g., payload information) in the form of optical signals transmitted through components (e.g., amplifier, multiplexer/de-multiplexer, etc.) and optical fibers connecting the components.

However, the components and the optical fibers of each optical network may introduce unwanted polarization-related optical impairments on the optical signals and change the state of polarization (SOP) randomly when the optical signals are transmitted through the optical network.

The polarization-related optical impairments, also known as polarization-dependent impairments, may include dependent loss, cross-phase modulation (XPM), and cross-polarization modulation (XPolM). The impact of such effects on the system depends on the state of polarization (SOP) of each optical signal and may cause severe performance degradation of the optical signal.

Therefore, systems and methods for mitigating the polarization-related optical effects are desired to improve performance, such as bit-error rate (BER), of a signal.

SUMMARY

The present disclosure describes an example system including an optical transmitter and receiver in an optical network. An optical signal transmitted from the optical transmitter to the optical receiver may be conceptually divided into a sequence of regular units (e.g., a sequence of frames, or a sequence of symbols). In some embodiments, each of a plurality of regular units defining a signal is associated a respective SOP that is different from a corresponding SOP of each other immediately adjacent unit. In the present disclosure, immediately adjacent units mean two units of the signal that are immediately adjacent to each other in the time domain. The SOP of the transmitted optical signal may be controlled by, at the transmitter, rotating the SOP of signal that is to be transmitted with a defined rotation pattern.

The SOPs of the sequence of units in the transmitted signal may form an alternating pattern (or other repeating pattern), which may help to lower the average BER, in particular, due to forward error correction (FEC). The quality or performance of a signal transmitted with the alternating pattern may be boosted significantly, compared to a conventionally transmitted optical signal.

In some embodiments, the optical receiver receiving the transmitted optical signal from the transmitter may be synchronized with the optical transmitter such that the optical receiver applies a defined de-rotating sequence that corresponds to the respective rotation pattern (which is applied at the transmitter). Such synchronized de-rotation enables the optical receiver to recover payload information from the transmitted optical signal with greater accuracy and less hardware requirements, compared to conventional solutions that do not use rotation and de-rotation patterns as discussed herein.

According to some example aspects, the present disclosure describes an optical transmitter in an optical network. The optical transmitter comprises an encoder, a rotator, and an electrical-optical converter. The encoder is configured to receive an input data stream and to encode the input data stream into a signal. The signal is defined as a sequence of regular units. The rotator is configured to receive each unit of the signal and to output, for each given input unit with an input state of polarization (SOP), a respective given output unit associated with an output SOP. The output SOP of the given output unit is different from a corresponding output SOP of each other output unit that is immediately adjacent to the given output unit. The electrical-optical converter is configured to convert the output units of the signal into an optical signal, wherein the output SOPs of output units of the signal are optical properties of the optical signal.

In any of the preceding aspects/embodiments, the sequence of regular units includes a sequence of frames. For each given input frame with the input SOP, the rotator is configured to output a respective given output frame associated with the output SOP. The output SOP of the given output frame is different from a corresponding output SOP of each other output frame that is immediately adjacent to the given output frame.

In any of the preceding aspects/embodiments, the sequence of regular units includes a sequence of symbols. For each given input symbol with the input SOP, the rotator is configured to output a respective given output symbol associated with the output SOP. The output SOP of the given output symbol is different from a corresponding output SOP of each other output symbol that is immediately adjacent to the given output symbol.

In any of the preceding aspects/embodiments, the encoder configured to encode the input data stream including the encoder configured to perform interleaving on the input data stream in respective interleaving windows, and wherein a length of each unit is shorter than a length of the respective interleaving window.

In any of the preceding aspects/embodiments, orientations of the output SOPs of the sequence of output units alternate with respect to each other.

In any of the preceding aspects/embodiments, each input unit and the output unit includes two polarization components. The rotator is configured to output the respective given output unit associated with the output SOP by multiplying a Jones matrix with a size 2*2 with the two polarization components of the given input unit to generate the two polarization components of the given output unit.

According to some example aspects, the present disclosure describes a method in an optical network. The method comprises encoding an input data stream into a signal, the signal being defined as a sequence of regular units; receiving each unit of the signal and outputting, for each given input unit with an input state of polarization (SOP), a respective given output unit associated with an output SOP, the output SOP of the given output unit being different from a corresponding output SOP of each other output unit that is immediately adjacent to the given output unit; and converting the output units of the signal into an optical signal, wherein the output SOPs of output units of the signal are optical properties of the optical signal.

In any of the preceding aspects/embodiments, the sequence of regular units includes a sequence of frames. For each given input frame with the input SOP, the method further comprises outputting a respective given output frame associated with the output SOP. The output SOP of the given output frame being different from a corresponding output SOP of each other output frame that is immediately adjacent to the given output frame.

In any of the preceding aspects/embodiments, the sequence of regular units includes a sequence of symbols. For each given input symbol with the input SOP, the method further comprises outputting a respective given output symbol associated with the output SOP. The output SOP of the given output symbol is different from a corresponding output SOP of each other output symbol that is immediately adjacent to the given output symbol.

In any of the preceding aspects/embodiments, orientations of the output SOPs of the plurality of output units alternate with respect to each other.

In any of the preceding aspects/embodiments, each input unit and the output unit includes two polarization components. Outputting the respective given output unit associated with the output SOP is performed by multiplying a Jones matrix with a 2*2 with the two polarization components of the given input unit to generate the two polarization components of the given output unit.

According to some example aspects, the present disclosure describes an optical receiver configured to be synchronized with an optical transmitter in an optical network. The optical receiver comprises a coherent receiver and a de-rotator. The coherent receiver is configured to receive an optical signal from the optical transmitter and convert the optical signal to an electrical signal. The electrical signal is defined as a sequence of regular units each associated with a state of polarization (SOP). For a given unit, the SOP of the given unit is different from a corresponding SOP of each other unit that is immediately adjacent to the given unit. The de-rotator is configured to receive the sequence of regular units of the electrical signal and to output, a sequence of output units. the de-rotator applies a defined de-rotation sequence to the sequence of regular units.

In any of the preceding aspects/embodiments, the sequence of regular units includes a sequence of symbols. For each given symbol, the SOP of the given symbol is different from a corresponding SOP of each other symbol that is immediately adjacent to the given symbol.

In any of the preceding aspects/embodiments, the sequence of regular units includes a sequence of frames. For each given frame, the SOP of the given frame is different from a corresponding SOP of each other frame that is immediately adjacent to the given frame.

In any of the preceding aspects/embodiments, the defined de-rotation sequence is indicated by the optical transmitter of the optical signal.

In any of the preceding aspects/embodiments, the defined de-rotation sequence defines an alternating de-rotation pattern.

In any of the preceding aspects/embodiments, the defined de-rotation sequence defines de-rotation for each symbol.

In any of the preceding aspects/embodiments, the defined de-rotation sequence defines de-rotation for each frame.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure provides a system and a method for transmitting an optical signal over a wavelength division multiplexing (WDM) channel, in which the optical signal is defined as a sequence of regular units in the time domain. The state of polarization (SOP) of the transmitted signal is switched by every unit or interval in time domain. In some embodiments, the signal is defined as a sequence of frames in time domain, and for each frame, a SOP of the frame is different from a SOP of each other immediately adjacent frame, in the time domain. In some embodiments, the signal is defined as a sequence of symbols in time domain, and for each symbol, a SOP of the symbol is different from a SOP of each other immediately adjacent symbols, in the time domain. Such a method for differentiating SOPs between adjacent intervals of a signal in time domain may enable the BER over the signal to be reduced, which may help to mitigate unwanted polarization-related optical impairments in the transmitted signal.

Figure 1:
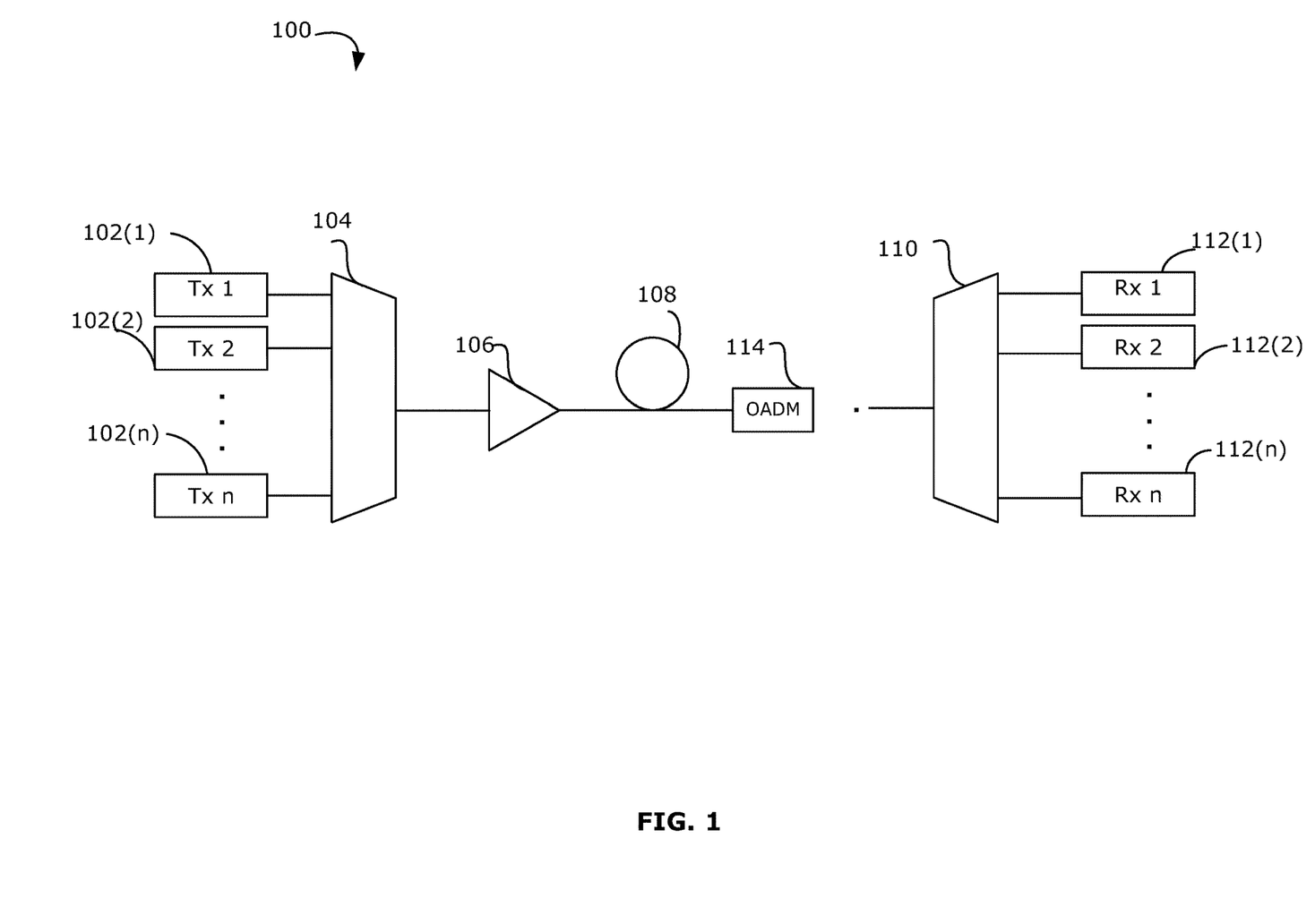
FIG. 1 illustrates an example optical network having at least one optical transmitter and at least one optical receiver in accordance with example embodiments.

FIG. 1 illustrates an example optical network 100 in which optical transmitters and receivers are used to generate and transmit an optical signal, in accordance to example embodiments. The optical network 100 includes one or more optical transmitters 102(1)-102(n) (generically referred to as optical transmitter 102), a multiplexer (MUX) 104, an amplifier 106, an optical fiber 108, an optical add/drop multiplexer (OADM) 114, a de-multiplexer (DEMUX) 110, and one or more optical receivers 112(1)-(n) (generically referred to as optical receiver 112). Each optical transmitter 102 generates, from a respective data stream, an optical signal that is defined by a sequence of regular units in time domain. As will be discussed further below, each unit of the transmitted signal is associated with a respective SOP. The unit may be a frame, a symbol, a sub-frame or multiple frames of the signal, for example.

In the example of FIG. 1, the MUX 104 is coupled to the optical transmitters 102 and combines the signals outputted from the transmitters 102 into a single WDM signal). The optical fiber 108 provides an optical path for the WDM signal to be transmitted to the DEMUX 110. There are typically multiple components along the optical fiber 108, some of which are illustrated in FIG. 1 The amplifier 106 amplifies the WDM signal and generates an amplified signal. The OADM 114 comprises an add/drop module to add and/or drop optical signals to the amplified signal, to be carried over the optical fiber 108. The transmitted signal is received at the DEMUX 110, which then splits the signal into a plurality of separate signals (e.g., splits the received WDM signal into separate signals over the respective wavelengths). Each receiver 112 receives a separate signal from a respective wavelength, transmitted from the corresponding optical transmitter 102, and recovers the received signal to extract payload information from the separate signal. The process of recovering the received signal performed at the receiver 112 will be discussed further below.

Although the optical network 100 as shown in FIG. 1 provides an example optical communication environment, this is only illustrative and is not intended to be limiting. In other examples, the optical network 100 may include other components, for example more than one MUX 104, a plurality of amplifiers 106, a plurality of optical fibers 108, a plurality of OADMs 114, and/or a plurality of DEMUXs 110.

As an optical signal is propagated through the optical network 100, different kinds of polarization-related optical impairments (e.g., polarization dependent loss (PDL), XPM, or cross polarization modulation (XPolM) may cause performance losses to the optical signal. In some scenarios, each component linked by the optical fiber 108 may introduce some PDL to the optical signal, leading to a net PDL impairments over the length of the optical fiber 108. Furthermore, the polarization-related optical impairments may not be characterizable, because impairments such as PDL may be random time-varying (e.g., based ambient factors, including temperature, strain, lighting, etc., among other factors). In particular, the principal axes of PDL (i.e., the polarization orientation where PDL has the greatest impairment) may be random, time-variable, and uncontrollable.

As well, there exists Kerr nonlinear interferences between neighboring channels, which may cause inter-channel impairments, such as XPM and/or XPolM impairments. The XPolM impairment may result in fading and channel cross-talk for dual-polarization signals. The XPM and XPolM impairments closely depend on the SOP of the optical signal and are stochastic because the SOP of the optical signal is uncontrollable. Furthermore, mitigation of the XPM and XPolM impairments, in particular for dual-polarization signals, may require high cost in hardware resources deployed in the optical network.

Figure 2:
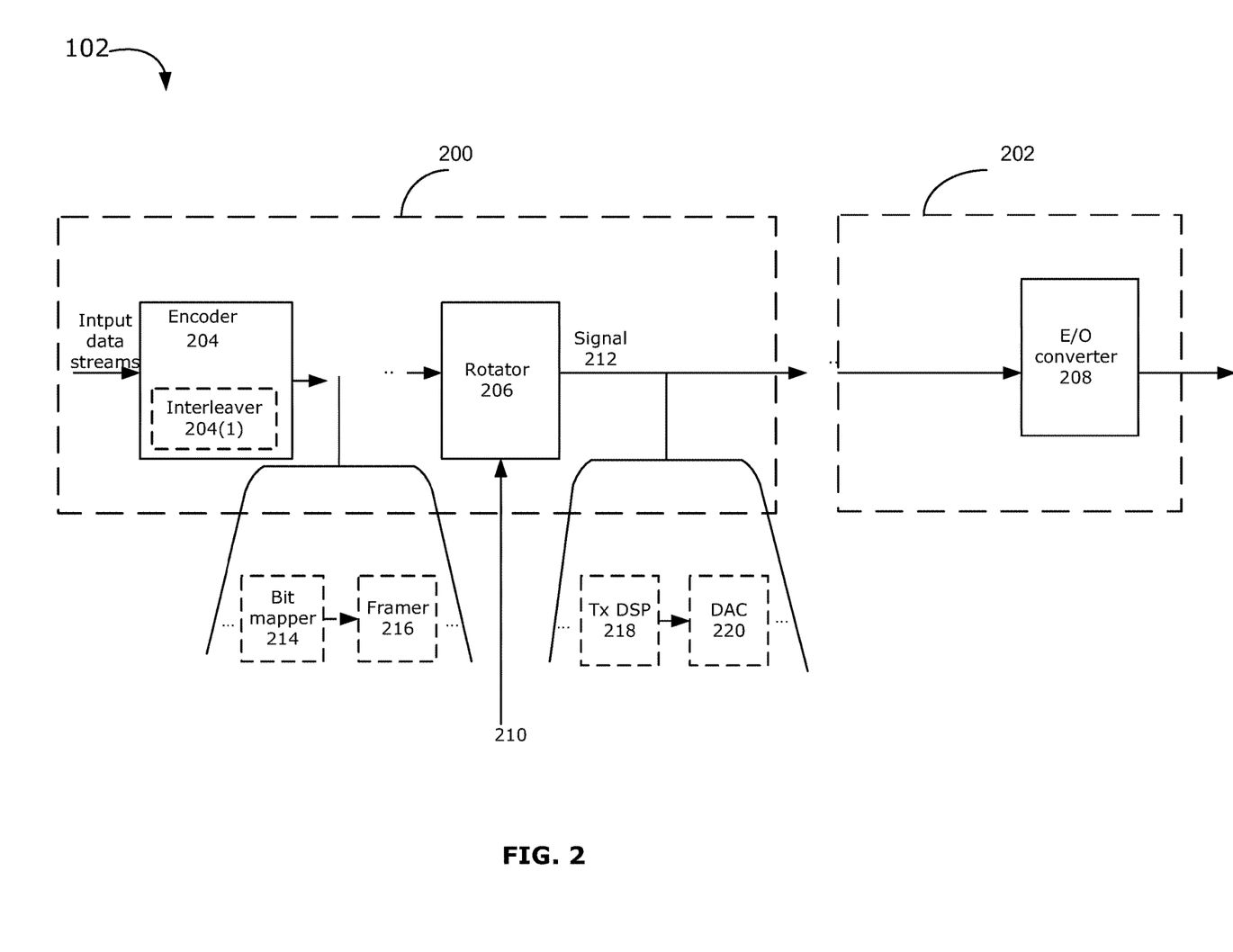
FIG. 2 is a block diagram of the optical transmitter of FIG. 1 in accordance with example embodiments.

FIG. 2 illustrates details of an example transmitter 102, which may be used to generate a signal that is defined as a sequence of regular units, each unit having a respective SOP. The transmitter 102 controls the SOP of the sequence of units in the transmitted signal, which may help to reduce average BER of the signal that is transmitted over a wavelength. The transmitter 102 includes an electrical module 200 and an optical module 202. The optical module 202 comprises an electrical-optical (E/O) converter 208 converting an electrical signal generated from the electrical module 200 to an optical signal that will be transmitted over the single wavelength. In some examples, if the electrical signal from the electrical module 200 is for a dual-polarization signal (e.g., including both polarization components on X and Y axis), the E/O converter 208 may be a set of Mach-Zehnder modulators.

With respect to the electrical module 200, the electrical module 200 at least includes a forward error correction (FEC) encoder 204 and a rotator 206. The encoder 204 receives an input data stream carrying payload information and performs encoding on the input data stream. An encoded electrical signal, defined as a sequence of regular units in time domain, is then generated from the encoder 204. The rotator 206 then receives the sequence of units of the encoded signal and outputs the signal 212 with a respective sequence of output units, each output unit associated with a respective output SOP. It is noted that the output SOPs of the output units are optical properties of an optical signal generated from the transmitter 102; however, in the present disclosure, the output SOPs are respectively associated with each output unit of the electrical signal 212. Therefore, manipulating (e.g., rotating) SOPs associated with the electrical signal 212 in digital or electrical domain enables the SOPs of the optical signal to be controlled.

Figure 3A:
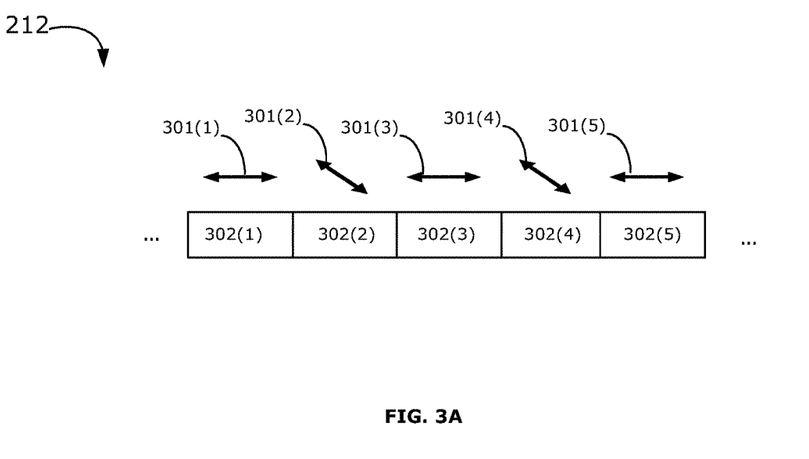
FIG. 3A illustrates an example signal defined by a plurality of units that is outputted from the rotator of FIG. 2.

In some examples, the respective output unit associated with the output SOP is outputted by the rotator 206 rotating the polarization of each unit of the received according to a defined rotation pattern. The output SOP of each given output unit is different from corresponding output SOPs of other output units that are immediately adjacent in time domain to the given output unit. In some examples, the signal may be defined as a sequence of frames (i.e., the regular units are frames), the rotator 206 may apply a rotation pattern that is defined on a per-frame basis, and the output unit may be a frame defined in time domain, such as each of frames 302(1)-(5) as shown in FIG. 3A. In some other examples, the signal may be defined as a sequence of symbols (i.e., the regular units are symbols), the rotator 206 may apply a rotation pattern that is defined on a per-symbol basis, and the output unit may be a symbol defined in time domain, such as symbols 502(1)-(8) of FIG. 5. In this example, a control signal 210 is used to trigger the rotator 206 to perform the rotation, such as applying a rotation pattern on each unit. The rotation pattern may be indicated or selected by the control signal 210. As described further below, the control signal 210 may control the rotator 206 to select a different respective rotation matrix (e.g., Jones matrices 406(1) and 406(2) as shown in FIGS. 4C and 4D) for each unit based on the corresponding rotation indicated in the rotation pattern. In some other examples, the rotation pattern may be pre-defined in a standard, and once the rotator 206 is triggered to performed the rotation, the rotator 206 applies the pre-defined rotation pattern to rotate the polarization of each unit.

Reference is now made to FIG. 3A, which presents an example of the signal 212 that is outputted from the rotator 206. The signal 212 in this example is defined as a sequence of output frames 302(1)-(5) (generically referred to as output frame 302) in time domain over the single wavelength. As shown in FIG. 3A, each output frame 302 is associated with an output SOP 301(1)-301(5) (generically referred to as output SOP 301). The output SOP 301 may include two orthogonal polarization components, which will be described in detail below. For simplicity, only one of the two orthogonal polarization components is shown as SOP 301 in FIG. 3A. The SOP of each input frame inputted to the rotator 206 is initialized to an identical relative orientation (e.g., linear polarization with 0° relative rotation between frames) during a reasonably short period (e.g., shorter than a period for rotation between two frames). The rotator 206 applies a respective rotation on each input frame and then outputs each output frame 302 with a respective output SOP 301. It should be noted that, in some instances (e.g., depending on the defined rotation pattern applied by the rotator 206), the rotation applied by the rotator 206 to an input frame may be a relative rotation of 0° (i.e., equivalent to applying no rotation), such that the SOP of a given input frame may be the same as the output SOP 301 of the corresponding output frame 302. For example, the rotator 206 may apply respectively 0°, 45°, 0°, 45°, 0° relative rotations on five input frames each with an input SOP with 0° relative rotation, and generate the output frames 302(1)-(5). Each output frame 302 has a respective relative output SOP (e.g., 0°, 45°, 0°, 45°, 0°). A SOP of each given frame 302 is different than those of other frames that are immediately adjacent in the time domain to the given frame 302. For example, the SOP 301(2) (corresponding to output frame 302(2)) is different than the SOPs 301(1) (corresponding to output frame 302(1)) and 301(3) (corresponding to output frame 302(3)). As demonstrated in FIG. 3A, orientations of output SOPs of output frames 302(1)-(5) alternate with respect to each other by 0° and 45°. Such a signal 212 with an alternating respective output SOP for each frame enables the average of BER over a sequence of output frames 302 to be lower than a highest BER in a worst-case scenario, which may help to reduce the system outage probability.

It should be appreciated that orientations (e.g., 0°, 45°, 0°, 45°, 0°) of SOPs are relative orientations, rather than absolute orientations. That means, an orientation of an SOP of a unit (e.g., a frame) has a degree (e.g., 0° or 45° or etc.) relative to some reference orientation (e.g., relative to an orientation of the first unit in the signal).

It should be understood that SOP includes state of linear polarization and state of circular polarization. In the example of FIG. 3A, linear polarization of each unit is rotated as denoted by 301(1)-(5) of FIG. 3A while circular polarization (e.g., ellipticity of the polarization) (not shown in FIG. 3A) of each unit is unchanged. In some other examples, rotation of SOPs may also include rotating circular polarization of each unit as well.

Figure 3B:
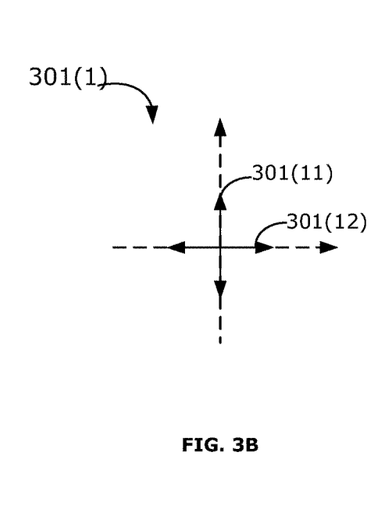
FIGS. 3B-3C each shows two polarization components of a respective SOP of a unit of the signal of FIG. 3A.
Figure 3C:
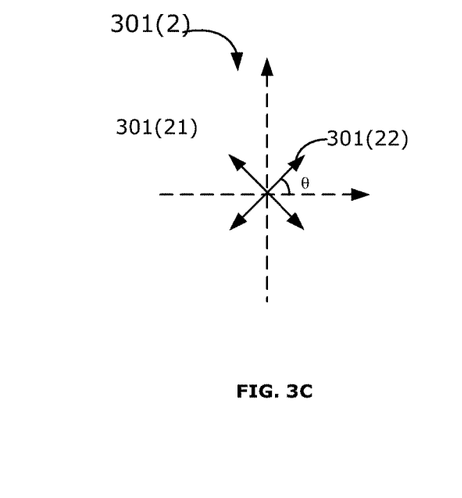

FIGS. 3B-3F illustrate why the average BER over the signal 212, in accordance with example embodiments, is lower than the BER that is highest in the worst-case scenario. Assuming two orthogonal polarization channels (i.e., dual-polarization signal), each SOP 301 of the signal 212 may include orthogonal polarization components along two principal axes as shown in FIGS. 3B and 3C. Similarly, PDL may also be expressed as two components along two principal axes (e.g., the axes with the highest and lowest losses). In FIGS. 3B and 3C, the principal axes of the signal 212 is shown (as thicker arrows) against the principal axes of PDL (shown as dashed arrows). It should be understood that when the principal axes of the signal 212 is exactly aligned with the principal axes of PDL, the impairments of PDL are most severe and the BER is highest. FIG. 3B shows a scenario with a highest BER where the signal has a SOP with 0° orientation with respect to the PDL, and the highest BER is indicated as 304(1) in FIG. 3D. Conversely, FIG. 3C shows a scenario with a lowest BER where the signal has a SOP with 45° orientation with respect to the PDL, such that there is least impairment of PDL, and the lowest BER is indicated as 304(2) in FIG. 3D.

Figure 3D:
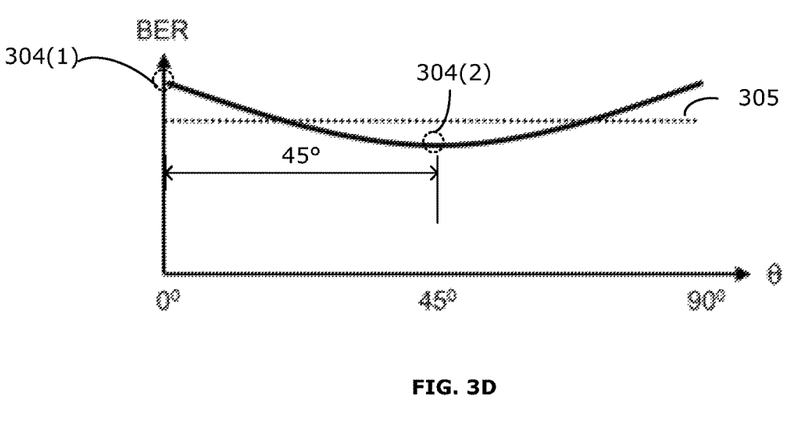
FIGS. 3D-3E show a respective plot of BER which varies with SOP of a transmitted signal.

FIG. 3D illustrates a plot of BER that is varied based on a degree θ between the orientation of the SOP and the principal axes of PDL. As shown in FIG. 3D, the BER reaches a highest value 304(1) when θ equals to 0°, and the BER has a lowest value 304(2) when θ equals to 45°. The dotted line 305 shows an average BER of the optical signal over time while θ is changing from 0° to 90°.

As the orientation of the principal axes of PDL is random, time-varying and unknown, it is difficult if not impossible to ensure the optical signal always has a SOP with 45° orientation with respect to the PDL. However, as disclosed herein, the example of alternating a SOP for each unit defined in the optical signal helps to ensure that the worst-case scenario (e.g., the BERs of all the units reach the highest value) does not always happen for all the SOP orientations.

Figure 3E:
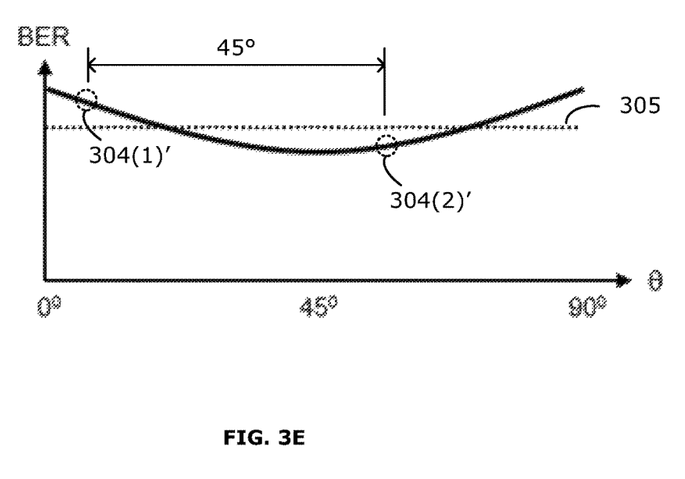

FIGS. 3D-3E each illustrates how BER changes between two SOPs that have a difference of 45° orientation with respect to each other, which may be implemented in the immediately adjacent units. As discussed above, in the case where one unit has a SOP of 0° orientation with respect to the principal axes of PDL, and the adjacent unit with a SOP with 45° orientation with respect to the principal axes of PDL, FIG. 3D shows that one unit experiences a highest BER 304(1) and the adjacent unit experiences the lowest BER 304(2). FIG. 3E demonstrates another example of alternating SOP orientations of adjacent units. In this example, one SOP orientation is set to have θ between 0° and 45°, which has a BER value 304(1)', and the other SOP orientation has θ between 45° and 90° having a BER value 304(2)'. The relative difference in orientation (e.g., 45°) in the SOPs of immediately adjacent units is the same as that in the example of FIG. 3D.

As shown in FIG. 3E, although neither the BER value 304(1)' nor the BER value 304(2)' reach the lowest BER, the average BER among the adjacent units over time is lower than the highest BER value in the worst-case scenario. Accordingly, the average BER is decreased among the plurality of units of the signal, and performance of the optical signal may be improved compared to the worst-case scenario (where all the BERs for all the units reach the highest value). Thus, by rotating the SOPs of the optical signal such that adjacent units of the signal do not have the same SOP, it can help to ensure that the worst-case scenario can be avoided, regardless of the random and time-varying nature of the PDL.

It is noted that in this example, the relative difference in orientation of SOPs between adjacent units is set to 45°, this is an example and not intended to be limiting, in other possible configurations, other relative orientations (e.g., 60° or 135°) may be applied in an alternating pattern.

Figure 3F:
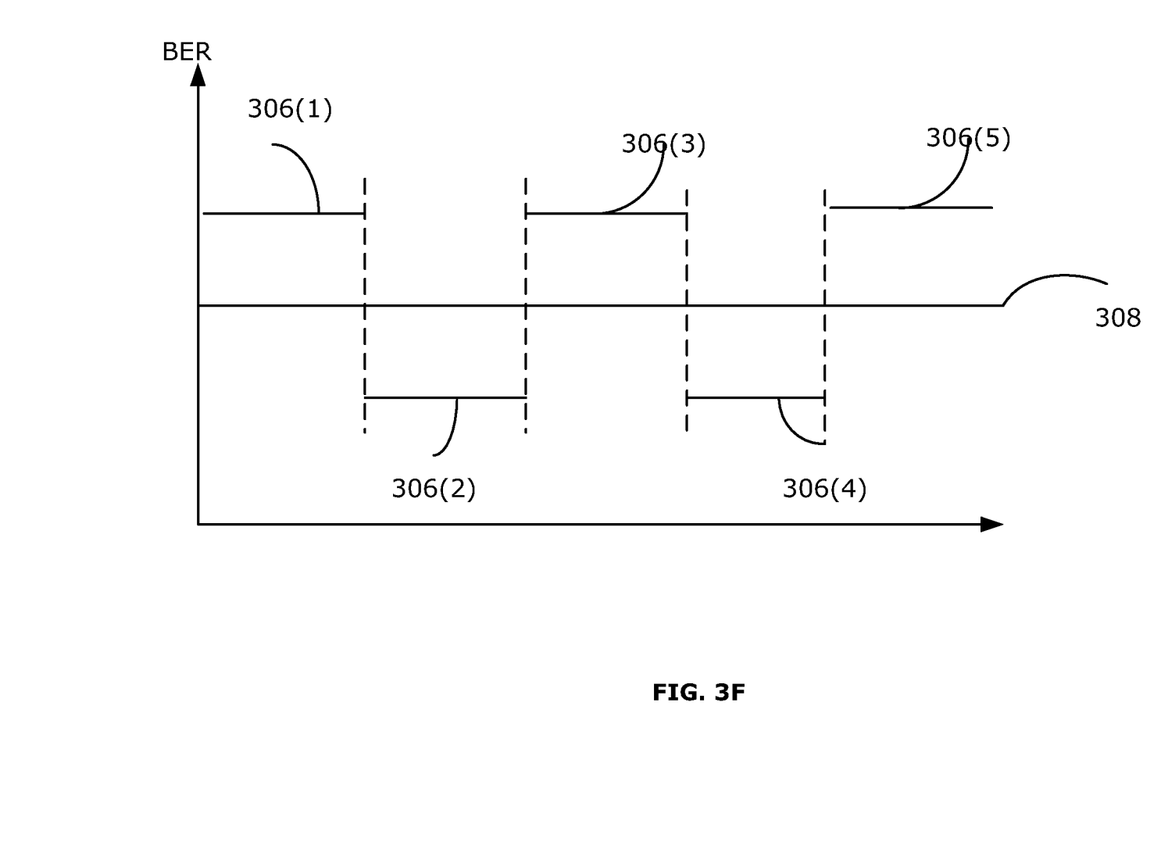
FIG. 3F shows a plot of BER over time and an average BER over time, for the example signal of FIG. 3A.

FIG. 3F shows a plot of the BER of the transmitted signal over time, in a scenario where the SOPs 301 of the frames 302 have been rotated in an alternating pattern (e.g., the alternating pattern is as follows: 0°, 45°, 0°, 45° . . . ). As the SOPs' orientations alternate between 0° and 45°, if one frame is at the worst SOP alignment (i.e., has SOP that aligns exactly with the PDL) then the immediately adjacent (in time domain) frames will be at the best SOP alignment (i.e., has SOP that is 45° offset with the PDL). The result is that the corresponding BERs 306(1)-(5) (generically referred to as BER 306) alternate between the highest possible value and the lowest possible value. Therefore, the average BER 308 over the plurality of frames 302 is lower than the highest BER (e.g., 306) in the worst-case scenario. In this case, the signal transmitted from the optical transmitter 102 may experience less performance degradation because the average BER is improved to be lower than the BER value in the worst-case scenario. Furthermore, as XPM and XPolM impairments depend on the relative orientations of SOPs between two co-propagating signals at different wavelengths, by alternating the rotation pattern of each propagating signal, the XPM and/or the XPolM impairments may be unchanged because the relative orientation of SOPs of each propagating signal varies alternatively such that the worst-case scenario can avoided. Therefore, the XPM and/or XPolM impairments induced by polarized signals, such as an on-off key (OOK) signal may be mitigated.

It should be understood that such an alternating pattern of SOPs of the frames would be beneficial to improve the overall BER even in the case where none of the frames is at the worst SOP alignment. For example, considering FIG. 3E, it can be seen that if two adjacent frames have respective SOPs that differ in orientation by 45° and neither frame is aligned with the axes of PDL, then the BER of both frames will be closer to the average BER 305 (e.g., as indicated by 304(1)' and 304(2)').

In some examples, a respective Jones matrix may be used by the rotator 206 to perform a respective SOP rotation. In such examples, the rotator 206 may be referred to as a Jones rotator. In the case where each input SOP may include two polarization components (e.g., X-polarization and Y-polarization components), the Jones matrix applied by the rotator 206 for each SOP rotation may be a 2*2 matrix.

Figure 4A:
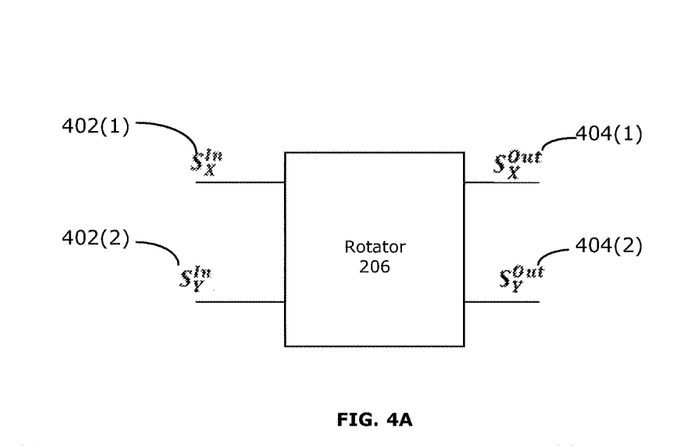
FIG. 4A is a block diagram of an example rotator where two polarization components are inputted in accordance with example embodiments.
Figure 4B:
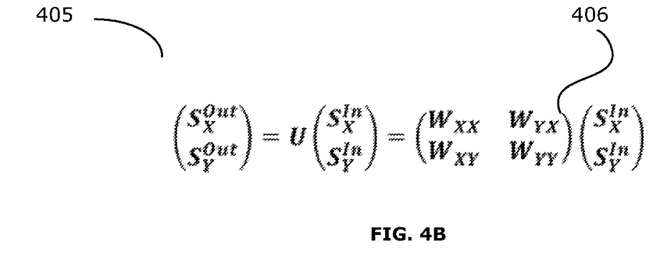
FIG. 4B shows an example equation that represents the rotation performed by the rotator of FIG. 4A.
Figure 4C:
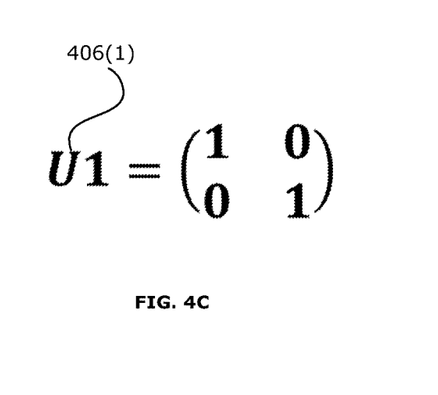
FIGS. 4C and 4D shows two different respective Jones matrices that may be applied by the rotator of FIG. 4A.
Figure 4D:
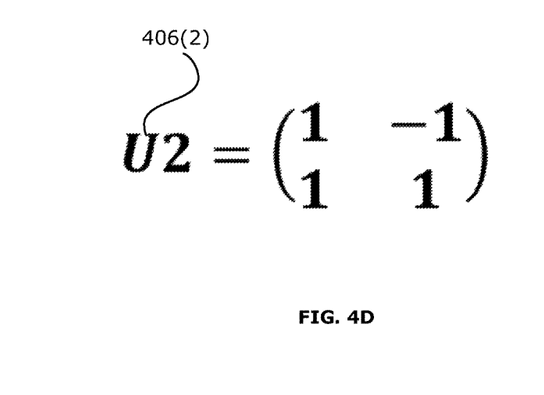

FIGS. 4A-4D illustrate how an example rotator 206 performs a respective rotation on each unit (e.g., frame) of an input signal to output the signal 212 including output frames 302 each associated with an output SOP 301 (e.g., see FIG. 3A). As shown in FIG. 4A, each unit of the input signal (e.g., input frame) includes two polarization components 402(1) and 402(2) on X and Y axes (denoted as $S^{In}_x$ and $S^{In}_y$, respectively). The rotator 206 performs rotation on each input unit by multiplying a respective Jones matrix (selected to be applied to the input unit according to a defined rotation pattern) with the input unit and outputs an output unit (e.g., output frame) including two polarization components 404(1) and 404(2) on X and Y axes (denoted as $S^{Out}_x$ and $S^{Out}_y$, respectively). FIG. 4B demonstrates an equation 405 representing the multiplication performed by the rotator 206 utilizing the respective Jones matrix 406. As denoted in FIG. 4B, in the case that each of the input signal and the output signal are decomposed into two polarization components, the Jones matrix 406 is a 2*2 matrix.

FIG. 4C shows an example Jones matrix 406(1) that is used for applying a 0° rotation. FIG. 4D shows an example Jones matrix 406(2) that is used for applying a 45° rotation. As will be appreciated, the Jones matrix 406(1) for applying a 0° rotation is the identity matrix, meaning no operation is performed on the input unit by the rotator 206.

In some examples, in order to keep the signal's power unchanged during transformation in the rotator 206, a normalization factor (in this case, a factor of 1/sqrt(2)) may be applied to the example Jones matrix 406(2).

Thus, it can be appreciated that, in some examples, the 45° rotation may be implemented by the rotator 206 using only adders. Such a simple implementation which may help to reduce complexity of the rotator 206 and help to reduce power consumption of the rotator 206, in practical implementation. As discussed above, the Jones matrix 406 is selected by the control signal 210 in FIG. 2. The orientations of rotations 0° and 45° in this example are only illustrative and are not intended to be limiting. In other examples, the orientations of rotations may be 90° or 135°, or any other pair of rotations that differ by 45°. In some examples, other rotation patterns may be used instead of alternating patterns. For example, a rotation pattern (e.g., a pattern with a pattern unit of 0°, 22.5°, 45°; a pattern with a pattern unit of 0°, 45°, 60°, 135°; or a pattern with a pattern unit of 0°, 45°, 90°, 135°) may be applied by the rotator 206 to output a signal. In some other examples, the control signal 210 may use a rule (e.g., the relative orientation of SOPs between adjacent units has a fixed degree, such as 45°, 60°, or 90°, etc.) to select the rotation pattern. In other possible configurations, orientations of rotation pattern may be regularly spaced along 180°, such as 0°, 60°, 120°. In the case where interleaving is performed in FEC encoding, each rotation interval within the rotation pattern may be within a respective interleaver window, which ensure that at least one rotation is performed within the respective FEC interleaver window. Therefore, averaging the BER to a relatively lower value can be achieved over the length of the FEC interleaver window.

Figure 5:
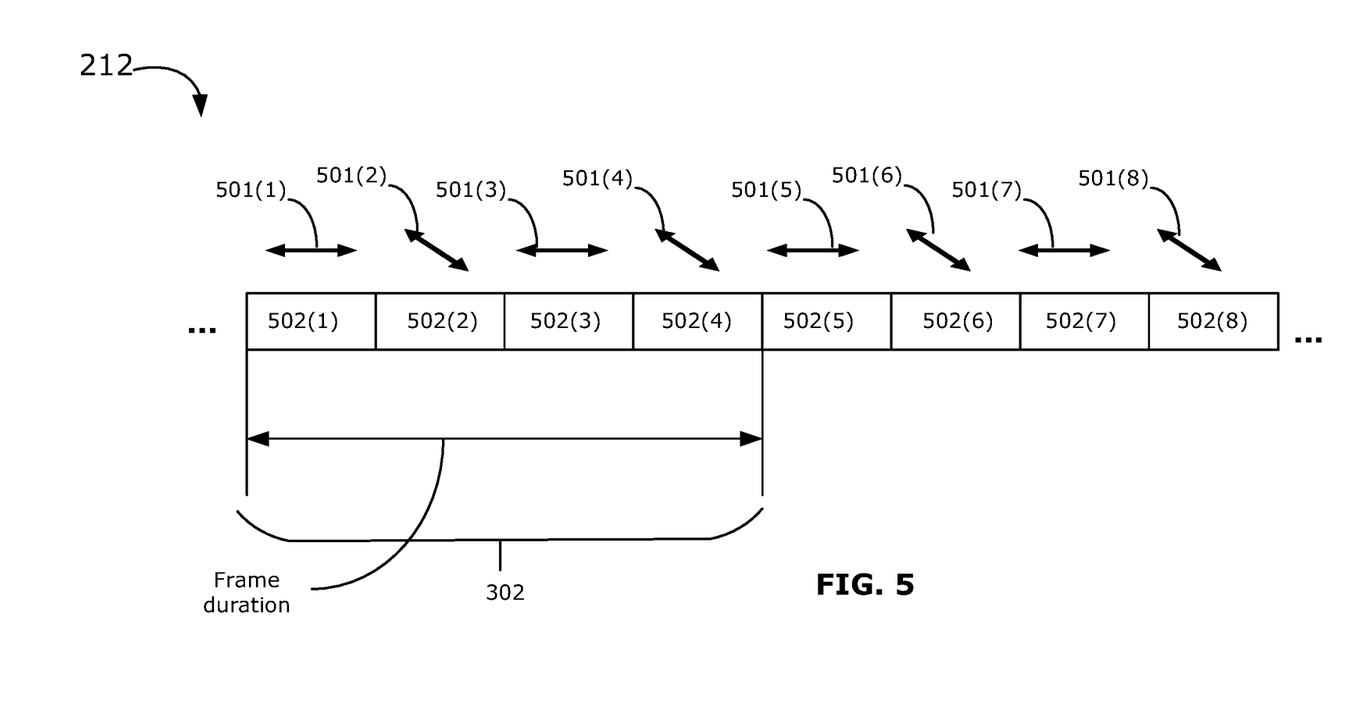
FIG. 5 illustrates another example signal defined by a plurality of symbols that is outputted from the rotator of FIG. 2.

FIG. 5 presents an alternative example of a rotation patterning in the case that each of the plurality of regular unit defining the signal 212 is a symbol 502(1)-(8) (generically referred to symbol 502) rather than a frame 302. The orientations of output SOPs 501(1)-(8) (generically referred to output SOP 501) have a pattern similar to the output SOPs 301 in FIG. 3A except that the signal 212 is defined as a sequence of output symbols 502 in this example of FIG. 5. That is, an alternating rotation pattern (e.g., 0°, 45°, 0°, 45° . . . ) is applied in an interval at symbol level in the example of FIG. 5 to perform the rotation, rather than the interval at frame level in FIG. 3A. Such a rotation pattern enables each given output symbol's SOP to be different than output SOPs of other symbols that are immediately adjacent (in time domain) to the given output symbol, which may help to reduce the average BER of the transmitted signal, in a manner similar to that discussed previously. The quality of the transmitted signal may be improved by mitigating the unwanted polarization-related optical impairments (e.g., PDL, XPM, and/or XPolM). In this example, SOP rotations applied by frame-by-frame or symbol-by-symbol is only illustrative and is not intended to be limiting. In some examples, SOP rotations may be applied between units each includes multiple frames, or sub-frames. The unit can be any suitable intervals as long as that de-rotation can be performed on those intervals in the receiver by using a de-rotation pattern corresponding to the rotation pattern with great efficiency and accuracy.

Referring to FIGS. 2 and 5 again, in some examples, a frame 302 includes a plurality of symbols 502(1)-502(4) in a frame duration, which may be interleaved symbols that are generated by an interleaver 204(1), which may be included in the encoder 204. While the encoder 204 performs encoding, such as the FEC coding, the interleaver 204(1) within the encoder 204 re-sequences (i.e., performs interleaving) a sequence of data streams within the frame duration in a respective interleaving window. The result of the interleaving is such that adjacent data streams in the frame duration are separated by a pre-determined distance. In some examples, the length of the frame duration may be shorter than a length of the respective interleaving window. By performing interleaving on the data streams within the frame duration, errors in one single data block of the data streams are spread into a plurality of data blocks, which may help to reduce the impact of errors over every single data block.

In some alternative examples, the optical transmitter 102 may at least further include a bit mapper 214, a framer 216, a transmission (Tx) digital signal processor (DSP) 218, and a digital-analog converter (DAC) 220. The bit mapper 214 may map the interleaved symbols into a desired signal format, such as phase-shifting keying (PSK) or quadrature amplitude modulation (QAM). For a signal that is a dual-polarization signal, the bit mapper 214 may generate two polarization components, one for X polarization and the other for Y polarization. The framer 216 may insert headers for each frame. After the rotator 206 performs the rotation, the Tx DSP 218 may perform digital filtering and pulse shaping on the signal 212. A digital-to-analog conversion may be then performed on the output of the Tx DSP 218 by the DAC 220 to generate an electrical signal. In the example of FIG. 2, the rotator 206 used to perform the rotation disclosed herein is positioned between the framer 216 and the Tx DSP 218. In some examples, the rotator 206 may be included in the DSP 218 to perform the rotation. In other examples, the rotator 206 may be deployed between the bit mapper 214 and the framer 216, or between the Tx DSP 218 and the DAC 220. It is noted that the location of rotator 206 may not affect the process of rotating input SOPs into output SOPs. Therefore, the position of the rotator 206 provides flexibility of the design of the optical transmitter 102 based on any suitable requirement, which may help to simplify implementation and/or reduce hardware cost for the transmitter 102.

Figure 6:
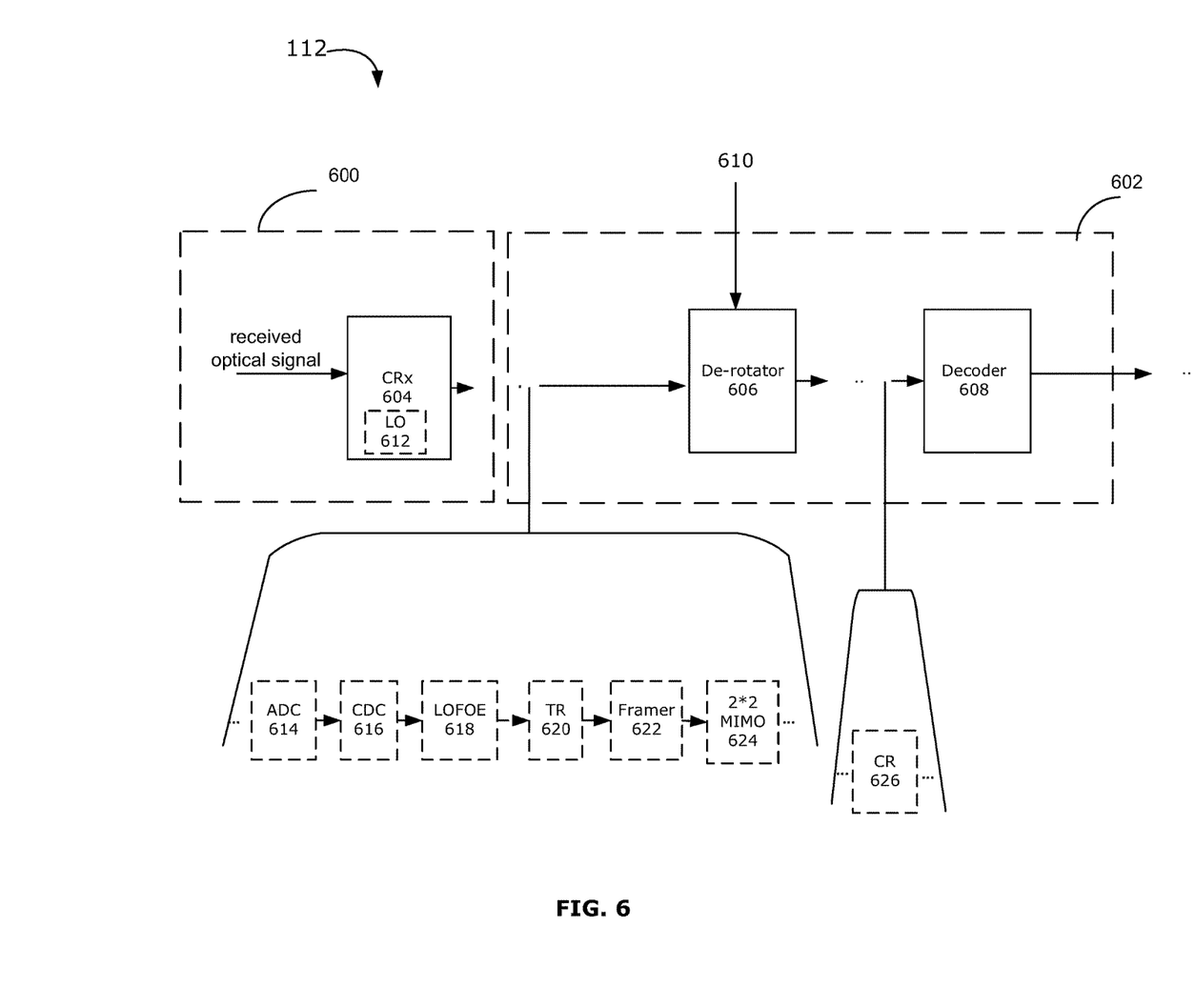
FIG. 6 is a block diagram of the optical receiver of FIG. 1 in accordance with example embodiments.

FIG. 6 is a block diagram of an example optical receiver 112 that receives the optical signal transmitted from the optical transmitter 102 and that recovers the payload information included in the optical signal. Each optical receiver 112 may operate with a corresponding optical transmitter 102 in a pair, such that each pair of optical transmitter 102 and optical receiver 112 transmits and receives, respectively, an optical signal over a given wavelength. The optical receiver 112 should be synchronized in time domain with the corresponding optical transmitter 102, in order to recover the payload information with greater accuracy, as discussed further below.

The optical receiver 112 may include an optical frontend (OE frontend) 600 and an electrical module 602. The OE frontend 600 includes an optical hybrid, local oscillator (LO) 612, and photodetectors. The LO 612 is a prerequisite for the optical receiver 112, which is called coherent receiver (CRx) 604 for detecting an optical signal. The OE frontend 600 converts the received optical signal into an electrical signal. Although the electrical module 602 is discussed below to include an analog-to-digital converter (ADC) 614 to covert analog signals into digital signals, in other possible configurations, the ADC 614 may be a part of the OE frontend 600 rather than the electrical module 602 to perform the conversion.

The electrical signal is defined as a sequence of regular units (e.g., frames or symbols). Each given unit has a SOP that is different from corresponding SOPs of other units that are immediately adjacent to the given unit. The electrical module 602 may include a de-rotator 606 that applies a defined de-rotation sequence to the sequence of units. In particular, the de-rotation sequence applied by the de-rotator 606 undoes the respective sequence of SOP rotations applied at the transmitter 102. The receiver 112 is synchronized with the transmitter 102 to enable the correction de-rotation to be applied to each unit (e.g., frame or symbol) of the received signal. For example, a trigger signal 610 (e.g., generated by a framer 622 as discussed further below) may indicate the start of a new frame and trigger the next de-rotation to be applied. Once the de-rotator 606 is triggered to perform the next de-rotation by the trigger signal 610, the de-rotator 606 may then apply the next de-rotation according to the defined de-rotation sequence to undo the rotation that was applied to the frame at the transmitter 102.

Further, the receiver 112 may be configured together with the transmitter 102 to use respective de-rotation and rotation patterns in real-time. For example, the defined de-rotation sequence applied in the de-rotator 606 may be pre-defined. In some examples, the transmitter 102 may communicate to the receiver 112 to indicate which de-rotation sequence to use through the optical signal. After de-rotation, the decoder 608 may decode the de-rotated units of the signal. In some examples, the decoder 608 may be a FEC decoder.

As discussed previously, the rotation pattern applied at the transmitter 102 may be rotation on a per-frame basis or on a per-symbol basis, for example. Whether the unit of rotation is a frame or a fixed length of symbols or a sub-frame may also be pre-defined in a standard, or different units may be pre-defined and may be indicated in a control signal. In other examples, the receiver 112 may determine the de-rotation pattern based on the received signals using simple trial-and-error detection. For example, if the rotation is applied by frame-by-frame, and there are two relative SOPs (e.g., the pattern is 0°, 45°), the receiver 112 may accurately determine a de-rotation pattern (e.g., using a two trials). Other such variations may be possible.

In some examples, the electrical module 602 of the receiver 112 may at least further comprise an analog-to-digital converter (ADC) 614, a chromatic dispersion compensator (CDC) 616, a local oscillator frequency offset estimator (LOFOE) 618, a timing recover (TR) 620, a framer 622, a 2*2 multiple input multiple output (MIMO) 624, and a carrier recover (CR) 626. The ADC 614 may convert the received signal to digital signal. The CDC 616 may use linear digital filters to perform chromatic dispersion compensation. The TR 620 may perform timing recovery on any time discrepancy between the transmitter 102 and the receiver 112. The framer 622 may detect a frame header from the received signal and use the information for triggering subsequent processing, such as the de-rotation described above. The 2*2 MIMO 624 may perform demultiplexing on the framed signal generated in the framer 622, and then the CR 626 may estimate and compensate carrier phase error on de-rotated signal.

As the receiver 112 operates with transmitter 102 in pair and is synchronized with the transmitter 102 on the rotating pattern/de-rotating pattern, the receiver 112 may perform de-rotation with the defined de-rotating pattern with greater accuracy.

Figure 7:
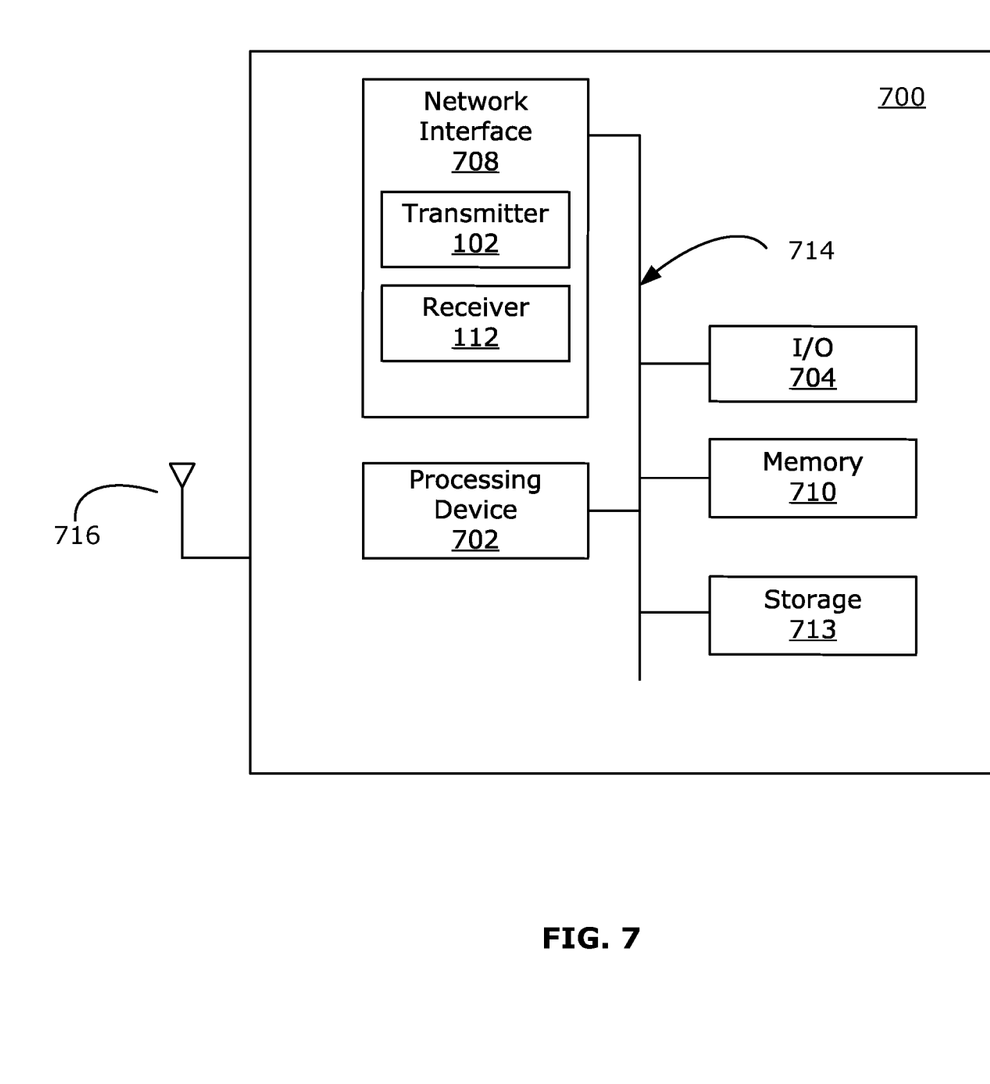
FIG. 7 is a block diagram illustrating a processing system which may be implemented at the optical transmitter of FIG. 2 or the optical receiver of FIG. 6, according to example embodiments.

FIG. 7 illustrates an example processing system 700 which may be used to implement methods and systems described herein, such as the example transmitter 102 or the receiver 112 as discussed herein. Other processing systems suitable for implementing the methods and systems described in the present disclosure may be used, which may include components different from those discussed below. Although FIG. 7 shows a single instance of each component, there may be multiple instances of each component in the processing system 700.

The processing system 700 may include one or more processing devices 702, such as a processor, a microprocessor, an application-specific integrated circuit (ASIC), a field-programmable gate array (FPGA), a dedicated logic circuitry, or combinations thereof. The processing system 700 may also include one or more input/output (I/O) interfaces 714, which may enable interfacing with one or more appropriate input devices and/or output devices (not shown). One or more of the input devices and/or output devices may be included as a component of the processing system 700 or may be external to the processing system 700. The processing system 700 may include one or more network interfaces 708 for wired or wireless communication with a network. In example embodiments, network interfaces 708 include one or more wireless interfaces such as transmitters 102 and receivers 112 that enable communications in a network. The network interface(s) 708 may include interfaces for wired links (e.g., Ethernet cable) and/or wireless links (e.g., one or more radio frequency links) for intra-network and/or inter-network communications. In this example, a single antenna 716 is shown, which may serve as both transmitting and receiving antenna. However, in other examples there may be separate antennas for transmitting and receiving.

The processing system 700 may also include one or more storage units 713, which may include a mass storage unit such as a solid state drive, a hard disk drive, a magnetic disk drive and/or an optical disk drive. The processing system 700 may include one or more memories 710, which may include a volatile or non-volatile memory (e.g., a flash memory, a random access memory (RAM), and/or a read-only memory (ROM)). The non-transitory memory(ies) 710 may store instructions for execution by the processing device(s) 702, such as to carry out the present disclosure. The memory(ies) 710 may include other software instructions, such as for implementing an operating system and other applications/functions. In some examples, one or more data sets and/or module(s) may be provided by an external memory (e.g., an external drive in wired or wireless communication with the processing system 700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 714 providing communication among components of the processing system 700, including the processing device(s) 702, I/O interface(s) 704, network interface(s) 708, storage unit(s) 713, memory(ies) 710. The bus 714 may be any suitable bus architecture including, for example, a memory bus, a peripheral bus or a video bus.

Figure 8:
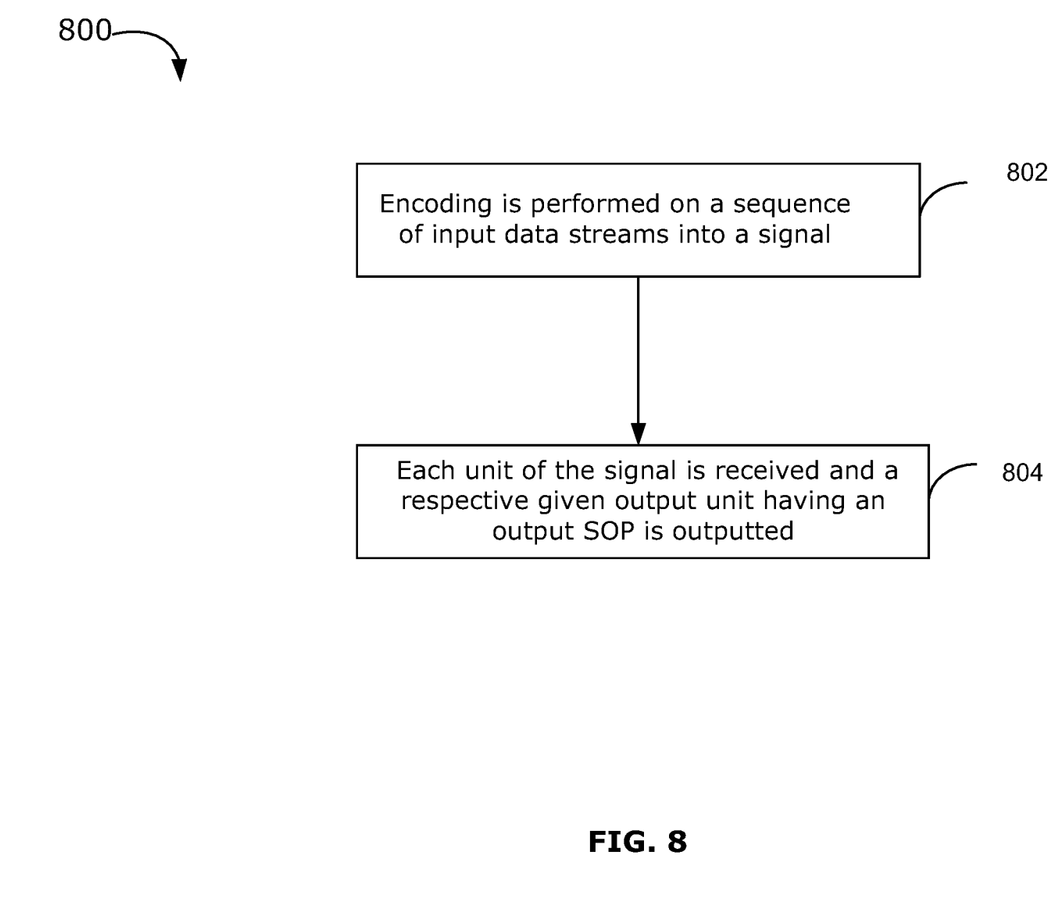
FIG. 8 is a flow chart illustrating an example method which may be carried out by the optical transmitter of FIG. 2, according to example embodiments.

FIG. 8 illustrates an example method that may be implemented at the optical transmitter 102 described above to enable an output SOP of a given regular unit defined in a signal to be different than those of other units defined in the signal that are immediately adjacent to the given unit. The method 800 includes:

At step 802, encoding is performed on a sequence of input data streams into a signal. The signal is defined as a sequence of regular units, such as frames 302 in the example of FIG. 3A or symbols 502 in the example of FIG. 5. This step may be implemented at the encoder 204 as shown in FIG. 2 to generate a signal over one single channel.

At step 804, each unit of the signal is received, and for each given input unit with an input SOP, a respective output unit with an output SOP is output. The output SOP of a given output unit (e.g., output SOP 301(2) of the frame 302(2) as shown FIG. 3A) is different from a corresponding output SOP (e.g., output SOPs 301(1), 301(3) of the frames 302(1) or 302(3) of FIG. 3A) of each other output unit that is immediately adjacent to the given output unit. Step 804 may be implemented at the rotator 206 of FIG. 2.

In the present disclosure, an example optical transmitter and receiver are described. An optical signal transmitted from the optical transmitter to the optical receiver over a wavelength may be conceptually divided into a sequence of regular units (e.g., a sequence of frames, or a sequence of symbols) in the time domain. By enabling SOP of each given unit of the signal to be different than those of immediately adjacent units (in time domain), the examples disclosed herein may enable a lower average BER, compared to a BER value in a worst-case scenario, which may help to improve performance of the signal. In some examples, the SOPs of a plurality of units defining the signal forms an alternating pattern (e.g., 0°, 45°, 0°, 45° . . . ). Further, the plurality of regular units defining the signal may be a plurality of frames or a plurality of symbols, which may provide flexibility to rotate SOPs in time domain. The examples disclosed herein may be implemented with little or negligible added hardware complexity to the disclosed transmitter, for example only adders may be needed to implement rotation in some embodiments.

In various examples, interleaving (e.g., by FEC encoder) may also be performed to reduce errors over the plurality of units of the signal over the wavelength.

In some applications, the example disclosed receiver may operate with the disclosed transmitter in a pair and may be synchronized with the disclosed transmitter. The disclosed receiver may apply a defined de-rotating sequence to perform de-rotation. The defined de-rotating sequence may be pre-defined in a standard or be indicated in a signal that is transmitted by the disclosed transmitter. Synchronizing the example disclosed transmitter with the optical receiver may enable the receiver to recover payload information from the transmitted signal with greater accuracy.

The example disclosed transmitter and receiver may be used in electronic devices, such as base stations, for example in optical telecommunication system, to boost system performance in optical networks. Furthermore, the disclosed optical transmitter and receiver may be implemented with little or no negative impact on efficiency and power consumption of the device. The hardware cost of the example disclosed transmitter and receiver may be lower, compared to conventional approaches used to mitigate polarization-related optical impairments (e.g., PDL, XPM, and/or XPolM) in communication networks.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an onboard processor, a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An optical transmitter in an optical network, comprising:
   an encoder configured to receive an input data stream and to encode the input data stream into a signal, the signal being defined as a sequence of frames, the encoder also configured to perform interleaving on the input data stream in respective interleaving windows, each interleaving window being longer than a length of each frame; and
   a rotator configured to receive each frame of the signal and to output, for a given input frame with an input state of polarization (SOP), a respective given output frame associated with one output SOP, the output SOP of the given output frame being different from a corresponding output SOP of at least one other output frame that is immediately adjacent to the given output frame;
   an electrical-optical converter configured to convert the output frames of the signal into an optical signal, wherein the output SOPs of output frames of the signal are optical properties of the optical signal.

2. The optical transmitter of claim 1, wherein orientations of the output SOPs of the sequence of output frames alternate with respect to each other.

3. The optical transmitter of claim 1, wherein each input frame and the output frame includes two polarization components; and
   the rotator configured to output the respective given output frame associated with the output SOP by:
   multiplying a Jones matrix with a size 2*2 with the two polarization components of the given input frame to generate the two polarization components of the given output frame.

4. A method in an optical network, comprising:
   encoding an input data stream into a signal, the signal being defined as a sequence of frames, wherein the encoding includes performing interleaving on the input data stream in respective interleaving windows, each interleaving window being longer than a length of each frame; and
   receiving each frame of the signal and outputting, for a given input frame with an input state of polarization (SOP), a respective given output frame associated with one output SOP, the output SOP of the given output frame being different from a corresponding output SOP of at least one other output frame that is immediately adjacent to the given output frame; and
   converting the output frames of the signal into an optical signal, wherein the output SOPs of output frames of the signal are optical properties of the optical signal.

5. The method of claim 4, wherein orientations of the output SOPs of the plurality of output frames alternate with respect to each other.

6. The method of claim 4, wherein each input frame and the output frame includes two polarization components; and outputting the respective given output frame associated with the output SOP is performed by:
   multiplying a Jones matrix with a 2*2 with the two polarization components of the given input frame to generate the two polarization components of the given output frame.

7. The method of claim 4, wherein orientations of the output SOPs of the sequence of output frames alternate with respect to each other.

8. An optical receiver configured to be synchronized with an optical transmitter in an optical network, comprising:
   a coherent receiver configured to receive an optical signal from the optical transmitter and convert the optical signal to an electrical signal, wherein the electrical signal being defined as a sequence of frames each associated with one state of polarization (SOP), for a given frame, the SOP of the given frame being different from a corresponding SOP of each other frame that is immediately adjacent to the given frame; and
   a de-rotator configured to receive the sequence of frames of the electrical signal and to output, a sequence of output frames, the de-rotator applying a defined de-rotation sequence to the sequence of frames.

9. The optical receiver of claim 8, wherein the defined de-rotation sequence is indicated by the optical transmitter of the optical signal.

10. The optical receiver of claim 8, wherein the defined de-rotation sequence defines an alternating de-rotation pattern.

11. The optical receiver of claim 8, wherein the defined de-rotation sequence applies alternating orientations of de-rotation to the sequence of frames.

* * * * *